(No Model.)  2 Sheets—Sheet 1.
J. HURT.
THERMAL VALVE.
No. 365,258.  Patented June 21, 1887.
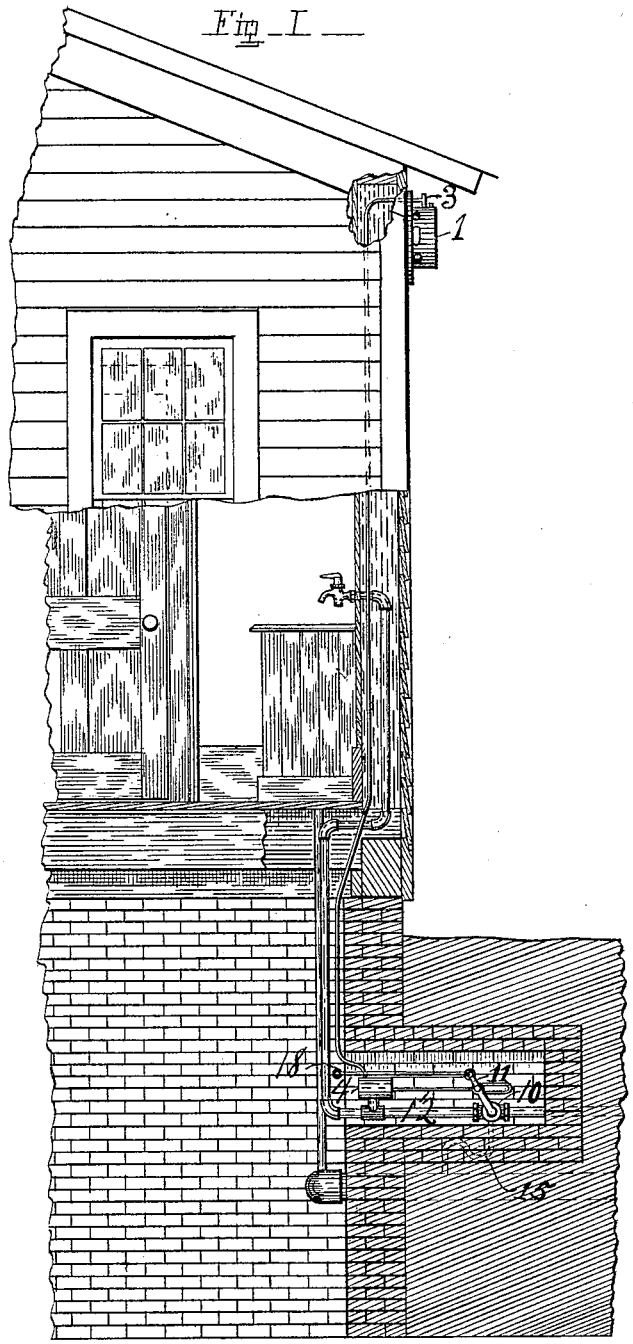
Fig. I.
Witnesses  
A. P. Wood  
George H. Crafts
Inventor  
Jael Hurt  
by Albert A. Wood, Att'y (No Model.) 2 Sheets—Sheet 2.
J. HURT.
THERMAL VALVE.
No. 365,258. Patented June 21, 1887.
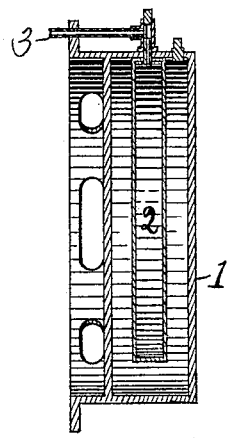
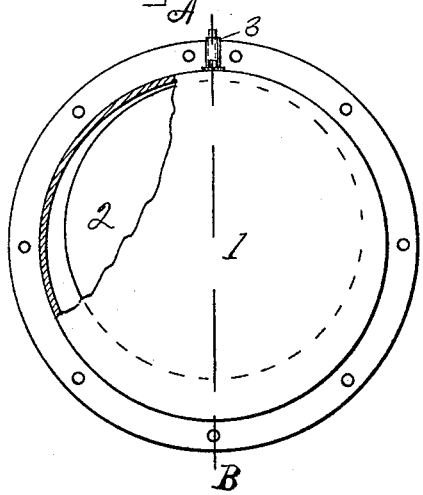
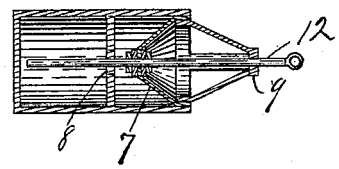
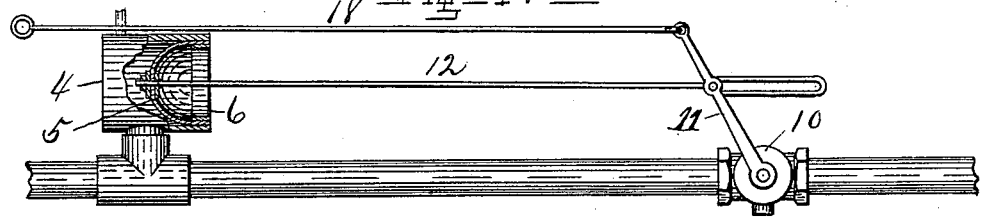
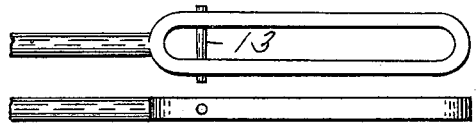
Witnesses
A. P. Wood
George H. Crafts
Inventor
Jael Hurt
By Albert A. Wood Att'y

UNITED STATES PATENT OFFICE.

JOEL HURT, OF ATLANTA, GEORGIA.

THERMAL VALVE.

SPECIFICATION forming part of Letters Patent No. 365,258, dated June 21, 1887.

Application filed September 27, 1886. Serial No. 214,692. (No model.)

*To all whom it may concern:*

Be it known that I, JOEL HURT, a citizen of the United States, residing at Atlanta, in the county of Fulton and State of Georgia, have invented a new and useful Thermal Valve; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an improvement in apparatus for automatically closing the valves of water-pipes to prevent them from freezing, and to automatically turn the water on again on the temperature rising above the freezing-point.

The improvement consists, primarily, in a freezing liquid in a sealed non-elastic vessel, which it, with an elastic vessel filled with non-freezing liquid, fills; and, secondarily, of a vessel which is non-elastic, with the exception of a flexible diaphragm which is connected to the lever of a valve which is so situated as to open and close the passage of a water or other supply-pipe, the latter vessel being connected by a pipe with the flexible vessel, and filled with the pipe with the non-freezing liquid the same as that contained in the flexible vessel.

It also consists in other and less essential details, which will be hereinafter fully described.

In the accompanying drawings I have shown, in Figure I, the device applied in one of the many ways in which it may be used—that is to say, attached to a pipe leading from the street or other main and into a frame house with a brick cellar. It will be obvious, after further description, that it may be attached in many other positions—for instance, in the building to shut off the water from an exposed pipe or valve, or at the point of discharge of a tank to protect all the piping; but for the purpose of description I prefer to show it as shown. Fig. II is the front, and Fig. III a section on the line A B, Fig. II, of a vessel that is adapted to be attached to the side of a building, and to contain and be filled with water, in which is submerged a flexible vessel, the whole to be sealed, with the exception of a vessel shown in Fig. IV, or of the modified form of this vessel shown in Fig. VI, which vessel is provided with a flexible diaphragm which forms one end, and is connected to the valve that cuts off the water. Fig. IV also shows means for opening the valve by hand. Fig. V shows the top and side somewhat enlarged of the rod that connects the flexible diaphragm with the lever on the valve. Fig. VI is a modification of the form of the flexible diaphragm and the vessel to which it is attached.

In the figures, like reference-marks referring to like parts, 1 represents a vessel, preferably of metal, in which is the flexible vessel 2, filled with a non-freezing liquid. The vessel 1, with the exception of the space occupied by the flexible vessel 2, is filled with a liquid that will freeze readily, preferably water, and is sealed to prevent the escape of the liquid by evaporation.

The flexible vessel 2 is filled with a liquid that will remain liquid at the temperature at which it is desired to have the valve close, and is connected by the pipe 3 with the vessel 4, which is provided in one of its ends with a flexible diaphragm, 5. The edge of the flexible diaphragm is preferably secured by a ring, 6, having sufficient size to insure, when inserted, as shown, that the joint around the diaphragm will be perfect and not liable to be disarranged. The valve 10 is preferably of a kind that will drain the pipes that are in the direction of the flow of the water beyond it, and that will be opened or closed by a partially rotary movement of the lever 11, which is connected through the rod 12 with the flexible diaphragm. The end of this rod is slotted, as shown in Fig. V, for the purpose of allowing the valve to be closed when the diaphragm and rod are in the position shown in Fig. IV; or the pin 13 may be put in, as shown in Fig. V, for the purpose of causing the valve-lever to be actuated in both directions by the flexible diaphragm. The waste-pipe 15 conducts the water that is drained from the pipes to a sewer or other convenient place. The rod 18 serves to actuate the valve by hand.

In the modification, Fig. VI, the flexible diaphragm 7 is of conical form instead of hemispherical, as shown in Fig. IV, and the rod 12 is provided with guiding supports or bearings 8 and 9. The vessel 1 has a projecting ring on the back side, as shown in Fig. I, to remove the body of it a sufficient distance from anything to which it may be attached in order to prevent the communication to it of any considerable amount of heat; and in furtherance of the same object the projecting ring is provided with openings to allow the circulation of air behind the vessel, as shown in Figs. I and III.

The flexible vessel 2 is preferably made of rubber or other elastic material, but may be made wholly or in part of sheet metal of such thickness as will permit the springing of its sides to accommodate the increased volume of the liquid in the outer vessel on the freezing of said liquid. The liquid displaced from the inner vessel, being conducted by the pipe 3 to the vessel having a flexible diaphragm, will press the diaphragm outwardly and cause the lever on the valve to close the valve and open communication for the water beyond the valve to the waste-pipe.

I will state the operation more concisely. The water surrounding the vessel 2 and filling the vessel 1, in freezing, will increase in volume about one-ninth, which increase in volume will force an equal amount of the non-freezing liquid from the flexible vessel 2 to the vessel having a flexible diaphragm, thereby causing the connecting-rod attached to it to force the valve lever over and close the valve. The connecting-rod, being slotted, as shown, will not bring the valve back when the shrinkage of the water in vessel 1 shall withdraw the non-freezing liquid from the vessel having the flexible diaphragm, thereby depressing the diaphragm, unless the pin 13 shall be used as shown in Fig. V, when the moving of the diaphragm will actuate the valve-lever in both directions, which may also be done by the rod 18. The rod 18 is also useful when the valve is in a position similar to that shown in Fig. I to depress the diaphragm whenever by accident any of the liquid in the operative parts shall have been lost, or a leak occur, allowing the pressure in the pipe 3 to extend the diaphragm and close the valve. This closing of the valve would give notice of the accident when the diaphragm might be compressed by pulling the rod 18, and the lost liquid, if any, would be supplied through the openings in the top of the vessel 1 or pipe 3, which should then be resealed.

The principle of the invention—consisting in the use of the expansion of freezing water to force outwardly a diaphragm, with suitable connections to a valve for the purpose of closing it—would not be departed from if the water were used in the vessel of which the flexible diaphragm forms a part; but it is generally preferable to apply the invention as shown, in order to be able to place the valve and the vessel containing the freezing liquid in the most suitable positions.

Having described my invention, what I claim as new, and desire to secure by Letters Patent of the United States, is—

1. As a means of closing a valve, an elastic vessel filled with a non-freezing liquid and placed in a non-elastic vessel, otherwise filled with a freezing liquid, the elastic vessel being connected by a pipe-connection with a vessel having a flexible diaphragm, which is connected to the lever of a valve for the purpose of closing the valve on the freezing of the freezing liquid, substantially as described.

2. In a thermal valve, the combination of the valve 10, having lever 11, which is connected to a flexible diaphragm of the vessel 4 by a slotted rod, 12, and pin 13, the pipe 3, the flexible vessel 2, containing a non-freezing liquid, the vessel 1, containing a freezing liquid, and the rod 18, substantially as described, and for the purpose specified.

In testimony whereof I affix my signature in presence of two witnesses.

JOEL HURT.

Witnesses:
JACK J. SPALDING,
WM. S. THOMSON.